(12) United States Patent
Zeng

(10) Patent No.: US 7,888,910 B2
(45) Date of Patent: Feb. 15, 2011

(54) SEQUENCING SWITCHED SINGLE CAPACITOR FOR AUTOMATIC EQUALIZATION OF BATTERIES CONNECTED IN SERIES

(75) Inventor: James Jin Xiong Zeng, Westwood, MA (US)

(73) Assignee: HDM Systems Corporation, Allston, MA (US)

( * ) Notice: Subject to any disclaimer, the term of this patent is extended or adjusted under 35 U.S.C. 154(b) by 691 days.

(21) Appl. No.: 11/947,702

(22) Filed: Nov. 29, 2007

(65) Prior Publication Data

US 2009/0140694 A1    Jun. 4, 2009

(51) Int. Cl.
*H02J 7/00* (2006.01)
*H03F 3/04* (2006.01)
*H03H 7/30* (2006.01)

(52) U.S. Cl. .................. 320/118; 320/124; 320/127; 320/128; 307/66; 330/304; 330/294; 330/107; 375/229

(58) Field of Classification Search .................. 320/118
See application file for complete search history.

(56) References Cited

U.S. PATENT DOCUMENTS

| | | | |
|---|---|---|---|
| 4,079,303 A | 3/1978 | Cox | |
| 4,479,083 A | 10/1984 | Sullivan | |
| 5,003,244 A | 3/1991 | Davis, Jr. | |
| 5,479,083 A | 12/1995 | Brainard | |
| 5,710,504 A | 1/1998 | Pascual | |
| 5,814,970 A | 9/1998 | Schmidt | |
| 6,008,623 A * | 12/1999 | Chen et al. | 320/118 |
| 6,150,795 A | 11/2000 | Kutkut | |
| 6,377,024 B1 * | 4/2002 | Choy | 320/118 |
| 2001/0040921 A1 * | 11/2001 | Guinea et al. | 375/229 |
| 2004/0141552 A1 * | 7/2004 | Yang et al. | 375/229 |
| 2007/0090799 A1 * | 4/2007 | Lee et al. | 320/118 |

* cited by examiner

*Primary Examiner*—Edward Tso
*Assistant Examiner*—Yalkew Fantu
(74) *Attorney, Agent, or Firm*—Blakely, Sokoloff, Taylor & Zafman LLP

(57) ABSTRACT

Techniques for sequencing switched single capacitor for automatic equalization of batteries connected in series are described herein. In one embodiment, a battery equalizer includes a single capacitor, at least two switching circuits to be coupled to each of at least two batteries coupled in series. The battery equalizer further includes at least two driver circuits corresponding the at least two switching circuits and a controller. The controller is programmed to control the driver circuits in order to drive the switching circuits to sequentially couple the single capacitor to one of the batteries coupled in series during charging and/or discharging of the batteries. Only one of the switching circuits is turned on at a given time such that only one of the batteries is coupled to the single capacitor at the given time. Other methods and apparatuses are also described.

21 Claims, 16 Drawing Sheets

SEQUENCING SWITCHED SINGLE CAPACITOR FOR AUTOMATIC EQUALIZATION OF BATTERIES CONNECTED IN SERIES

FIELD OF THE INVENTION

The present invention relates generally to charging and discharging batteries. More particularly, this invention relates to equalization of charging and discharging batteries.

BACKGROUND

Series strings of storage batteries are extensively used in various industries. Series strings are also used in electric vehicles and new power backup applications. The ability to uniformly charge the batteries in such strings is very important in these situations. If a series string is charged as a unit, slight mismatches or temperature differences between batteries cause charge imbalance. Once imbalance occurs, it tends to grow with time. "Charge equalization" cycles must be used in an attempt to correct imbalance. It has been recognized that such processes stress the batteries, shorten their lives, and are not always effective.

Users of battery strings have long been aware of the charge of imbalance problems associated with series charging, although it is only recently that imbalance has been considered to be a major limiting factor. The extent of the problem depends on the specific application. During the charging process, an imbalance will cause some cells to be undercharged while others will be overcharged. The operation of a series string is limited by the weakest cell, so local undercharging is a problem.

In practice, charge balance, or "equalization," must be carried out periodically to avoid long-term severe imbalance. Equalization is most often performed by extending the charging process. Using this approach, the cells having the highest voltage are forcibly overcharged while those having lower voltages are brought up to full charge. Battery equalizers have been used recently, but it has been a lack of effective equalizers in the industries.

SUMMARY OF THE DESCRIPTION

Techniques for sequencing switched single capacitor for automatic equalization of batteries connected in series are described herein. In one embodiment, a battery equalizer includes a single capacitor, at least two switching circuits coupled to the single capacitor, where each of the at least two switching circuits is to be coupled to each of at least two batteries coupled in series. The battery equalizer further includes at least two driver circuits, each corresponding to one of the at least two switching circuits and a controller coupled to the at least two driver circuits. The controller is programmed to control the at least two driver circuits in order to drive the at least two switching circuits to sequentially couple the single capacitor to one of the at least two batteries coupled in series during charging and/or discharging of the at least two batteries. Only one of the at least two switching circuits is turned on at a given time such that only one of the at least two batteries is coupled to the single capacitor at the given time.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a battery voltage balancing apparatus is utilized to distribute charge and equalizes voltages of 2 to "n" number of cells among a series connected string which can be floating or loaded to an electrical charging/discharging system. Using a sequencing switched distribution algorithm from a single capacitor, energy is transferred from an overcharged cell to an undercharged cell until all cells within an "n" string reaches its equilibrium. Premature failures and reduction of life cycles due to charging variations can be reduced for batteries among a series string. This modular equalization device could be used as a standalone unit, in a charger system, inverter system, or inverter/charger combination systems.

Figure 1:
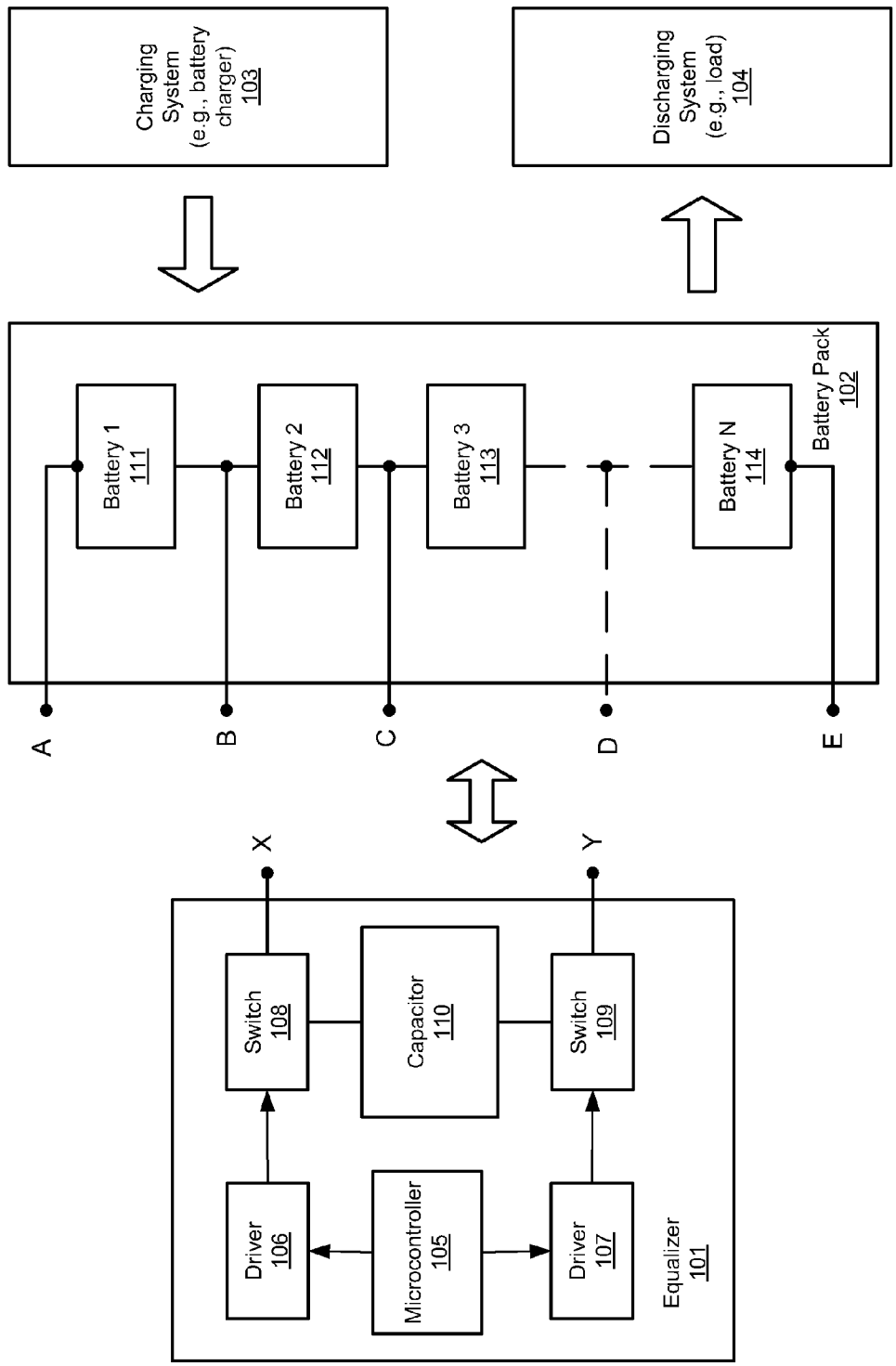
FIG. 1 is a block diagram of a battery charging/discharging system according to one embodiment of the invention.

FIG. 1 is a block diagram of a battery charging/discharging system according to one embodiment of the invention. Referring to FIG. 1, system 100 includes a battery equalizer 101 to equalize a battery pack 102 having multiple individual batteries coupled in series when the battery pack 102 is being charged by a charger 103 and/or discharged by a discharger 104. For example, battery pack 102 may be used in a motor vehicle. The discharger 104 may an inverter having an input coupled to the battery pack 102 to convert a DC (direct current) voltage provided from the battery pack 102 into an AC (alternating current) voltage.

According to one embodiment, equalizer 101 includes, but is not limited to, a microcontroller 105 having executable machine instructions stored (e.g., instructions programmed and written into a read-only memory or ROM) therein, which when executed by the microcontroller 105, controls drivers 106-107 which in turn drive switches 108-109 on and off. For example, controller 105 may be a FPGA (field programmable gate array). Drivers 106-107 may be implemented as a single driver or separate drivers. Likewise, switches 108-109 may include multiple switches or switching elements, for example, one for each of the batteries 111-114. When switches 108-109 are turned on, an energy storage device 110, in this example, a single capacitor, is coupled to one of the batteries 111-114 for balancing the charging and/or discharging batteries 111-114.

In one embodiment, the capacitor 110, under the control of microcontroller, is sequentially coupled to only one of the batteries 111-114 at a given time. For example, during a first timer period, terminals X and Y of equalizer 101 are coupled to terminals A and B of battery 111. During a second time period, terminals X and Y are coupled to terminals B and C of battery 112, to terminals C and D of battery 113 during a third time period, and to terminals D and E of battery 114 during the $N^{th}$ time period. Thus, at a given time period, only one of the batteries 111-114 is coupled to the capacitor 110. When capacitor 110 is coupled to an overcharged battery, the battery is discharged and the capacitor 110 is charged from the battery. When capacitor 110 is subsequently coupled to an undercharged battery, the battery is charged by capacitor 110 using the energy previously charged and stored by another battery. This in effect "transfers" the energy from an overcharged battery to an undercharged battery. As a result, the batteries coupled in series are balanced during charging/discharging.

Figure 2A:
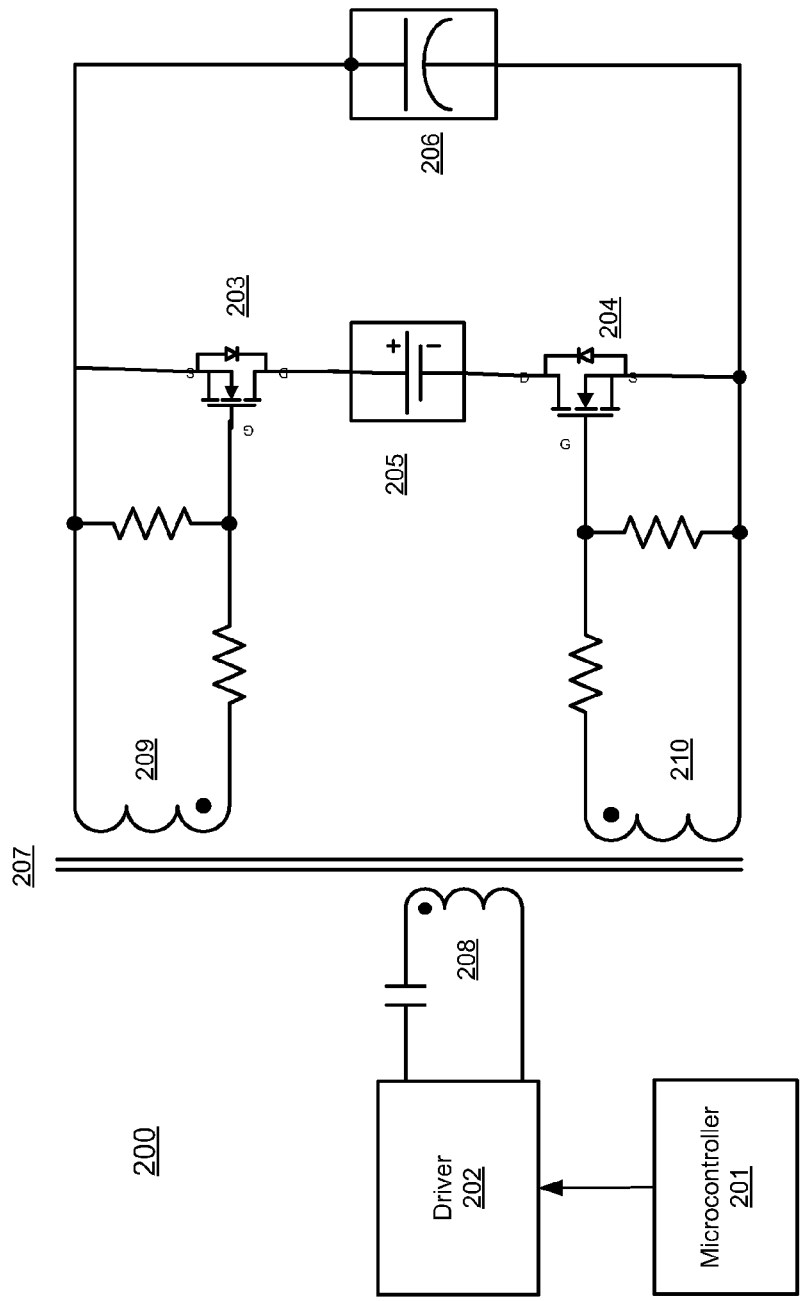
FIGS. 2A-2B are schematic diagrams illustrating an example of a battery equalizer according to certain embodiments of the invention.

FIG. 2A is a schematic diagram illustrating an example of a battery equalizer according to one embodiment of the invention. For example, equalizer 200, except battery 205, may be implemented as part of equalizer 101 of FIG. 1. Battery 205 may be implemented as any one of batteries 111-114 of FIG. 1. Referring to FIG. 2A, equalizer 200 includes, but is not limited to, a microcontroller 201 for controlling driver 202 which in turn drives switches 203 and 204 in order to couple battery 205 to capacitor 206 for balancing purposes. In addition, a transformer 207 is utilized for DC isolation. Transformer 207 includes a primary winding 208 and secondary windings 209-210. The primary winding 208 is coupled to an output of driver 202. The first secondary winding 209 is coupled to switch 203 and the second secondary winding 210 is coupled to switch 204.

In this example, an n-channel field-effect transistor (FET) is used for switches 203-204. The terminals of the secondary winding 209 are coupled to a gate terminal and a source terminal of FET 203. The terminals of the secondary winding 210 are coupled to a gate terminal and a source terminal of FET 204. The drain and source terminals of FET 203 are coupled to a positive terminal of battery 205 and a positive terminal of capacitor 206 respectively. The source and drain terminals of FET 204 are coupled to a negative terminal of capacitor 206 and a negative terminal of battery 205 respectively.

In one embodiment, in response to a signal originated from controller 201, driver 202, and/or primary winding 208 of transformer 207, secondary windings 209-210 generate control signals for switches 203-204. When the gate terminal of FET 203 is logically high in view of the source terminal, FET 203 is turned on, which in turn couples the positive terminal of capacitor 206 to the positive terminal of battery 205. Likewise, when the gate terminal of FET 204 is logically high in view of the source terminal, FET 204 is turned on, which in turn couples the negative terminal of capacitor 206 to the negative terminal of battery 205. When any of the gate terminals of FETs 203-204 is logically low in view of the corresponding source terminal, the corresponding FET is turned off and as a result, capacitor 206 is decoupled from battery 205.

Figure 2B:
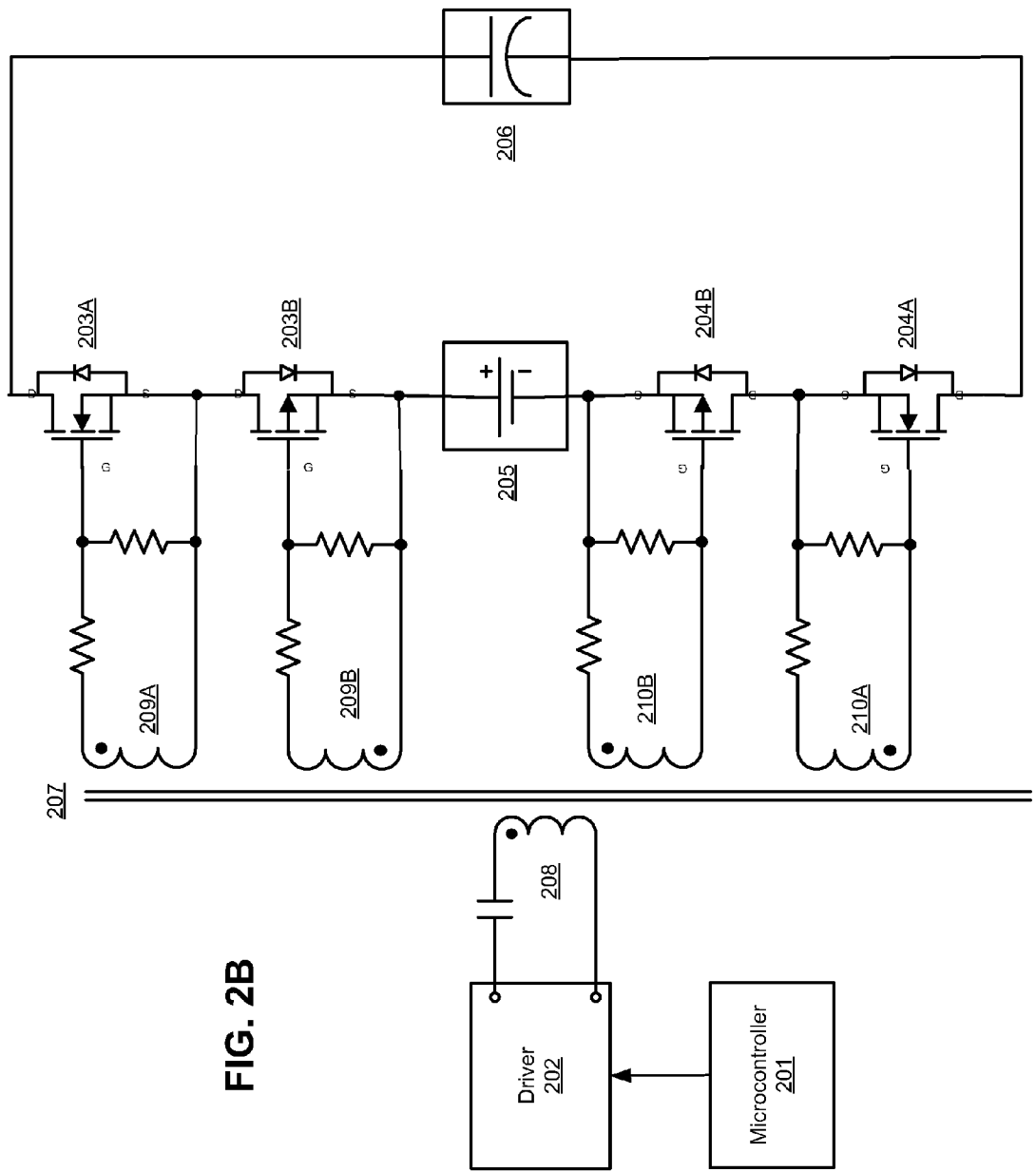

FIG. 2B is a schematic diagram illustrating an example of a battery equalizer according to an alternative embodiment of the invention. In this example, switch element 203 of FIG. 2A is implemented in a pair of FETs having an n-channel FET (NFET) 203A and a p-channel FET (PFET) 203B coupled in series. Likewise, switch element 204 of FIG. 2A is implemented in a pair of FETs having an NFET 204A and a PFET 204B coupled in series. For example, a PFET may be an IRF-7240 compatible PFET and an NFET may be an IRF-7493 compatible NFET, both available from International Rectifier. In order to drive the FETs 203A-203B, the secondary winding 209 of FIG. 2A includes further secondary windings 209A and 209B. Likewise, in order to drive FETs 204A-204B, the secondary winding 210 of FIG. 2A includes further secondary windings 210A-210B.

Referring to FIG. 2B, secondary winding 209A is coupled to a gate terminal and a source terminal of FET 203A and secondary winding 209B is coupled to a gate terminal and a source terminal of FET 203B. The source terminal of FET 203A is coupled to a drain terminal of FET 203B. The source terminal of FET 203B is coupled to a positive terminal of battery 205 and a drain terminal of FET 203A is coupled to a positive terminal of capacitor 206.

Similarly, secondary winding 210A is coupled to a gate terminal and a source terminal of FET 204A and secondary winding 210B is coupled to a gate terminal and a source terminal of FET 204B. The source terminal of FET 204A is coupled to a drain terminal of FET 204B. The source terminal of FET 204B is coupled to a negative terminal of battery 205 and a drain terminal of FET 204A is coupled to a negative terminal of capacitor 206.

In operations, in response to a signal received from the primary winding 208, the secondary windings 209A-209B cause the FETs 203A-203B to be turned on, which in turn couples the positive terminal of battery 205 with the positive terminal of capacitor 206. Likewise, in response to a signal received from the primary winding 208, the secondary windings 210A-210B cause the FETs 204A-204B to be turned on, which in turn couples the negative terminal of battery 205 with the negative terminal of capacitor 206. As a result, there is a current flowing between battery 205 and capacitor 206 for balancing charge/discharge purposes.

Note that in the examples as shown in FIGS. 2A-2B, only one battery is shown for the purpose of illustration only. It will be appreciated that more batteries may be coupled with battery 205 in series. Likewise, more driver circuits, switches, and transformers may also be utilized for additional batteries in series as shown in FIG. 3.

Figure 3:
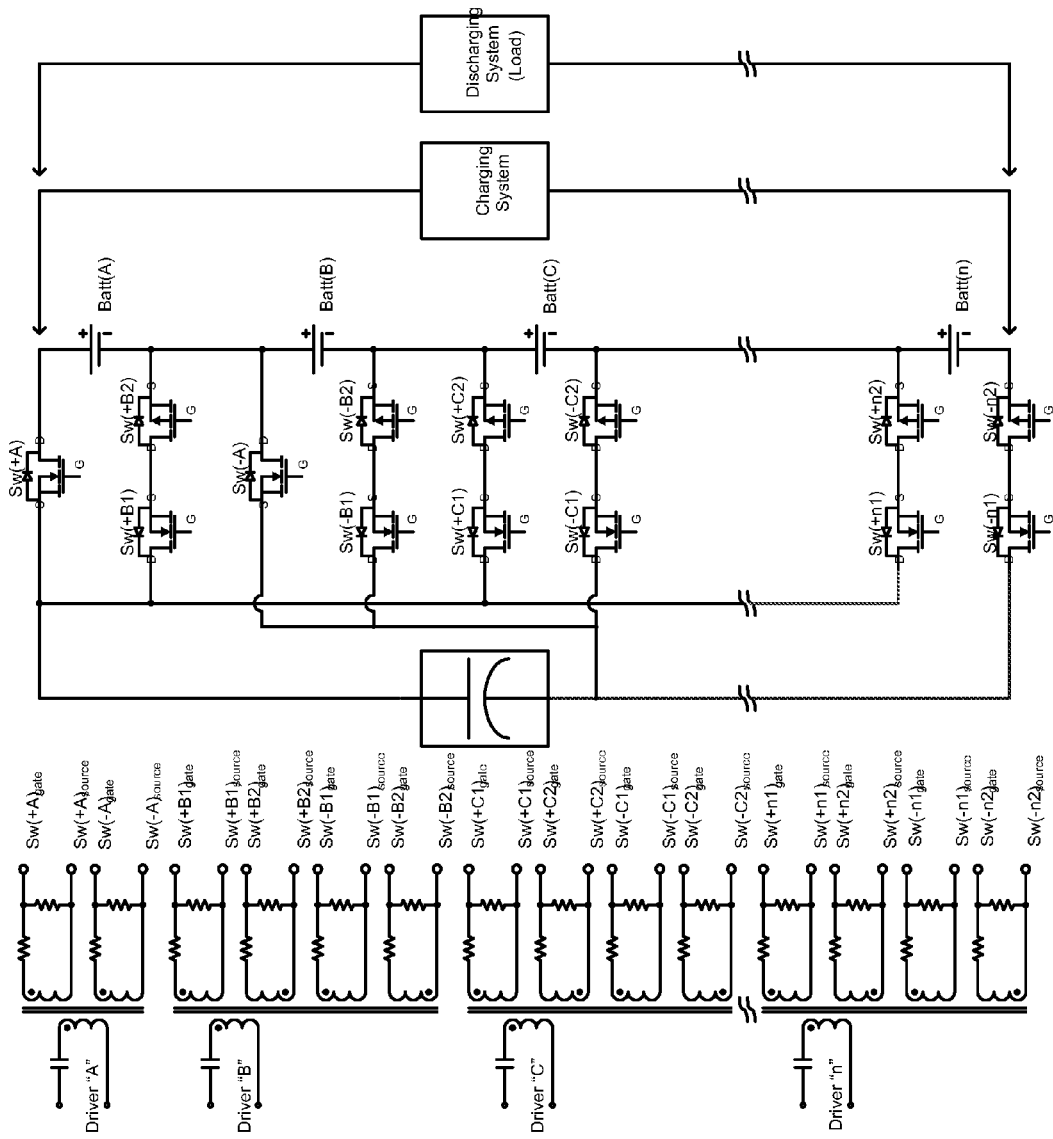
FIG. 3 is a schematic diagram illustrating an example of a battery charging and/or discharging system according to another embodiment of the invention.

FIG. 3 is a schematic diagram illustrating an example of a battery charging and/or discharging system according to another embodiment of the invention. Referring to FIG. 3, in this example, there are N batteries coupled in series being charged by a charging system, discharged by a load, or a combination of being charged and discharged. The switch element for coupling the corresponding battery to the capacitor may be implemented as a single FET as shown in FIG. 2A or multiple FETs as shown in FIG. 2B. For each battery, there is separate transformer having a primary winding coupled to a corresponding driver circuit. The number of secondary windings is dependent upon a number of FETs used. There is one secondary winding per FET. In operations, each of the batteries A-N is sequentially coupled to the capacitor, one at a given time.

Figure 4A:
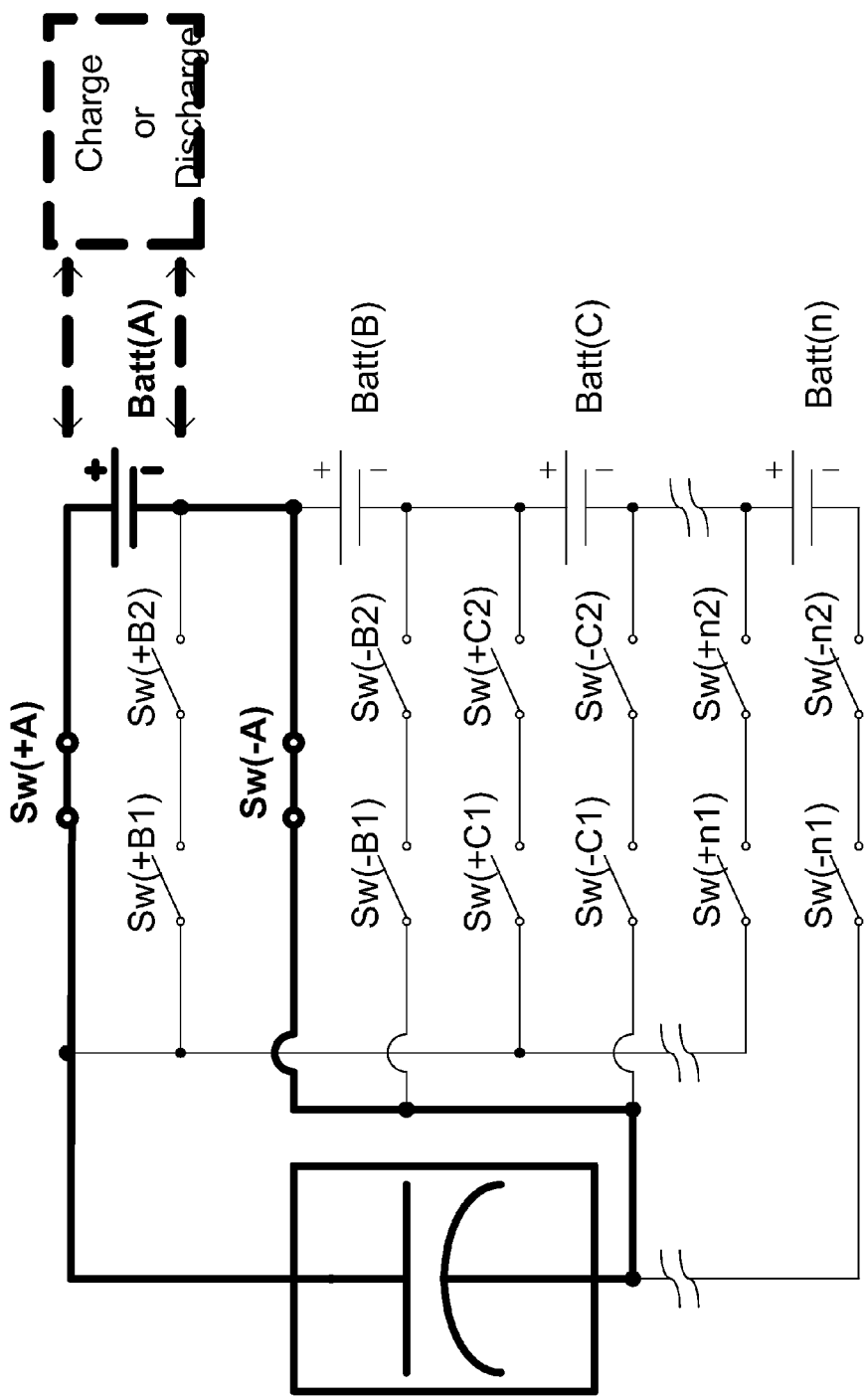
FIGS. 4A-4D are block diagrams illustrating a process of sequentially coupling each of batteries coupled in series according to one embodiment of the invention.
Figure 4B:
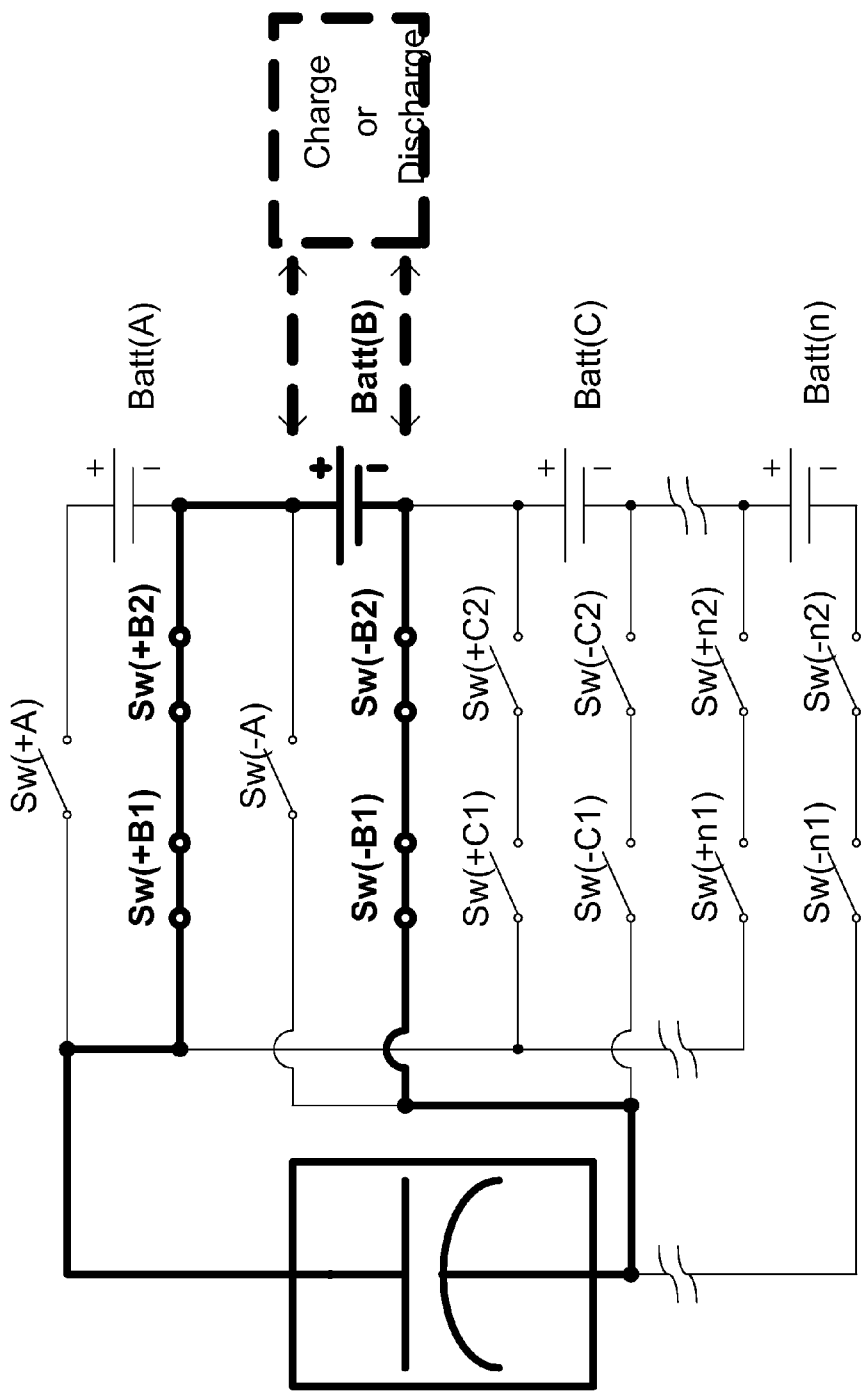
Figure 4C:
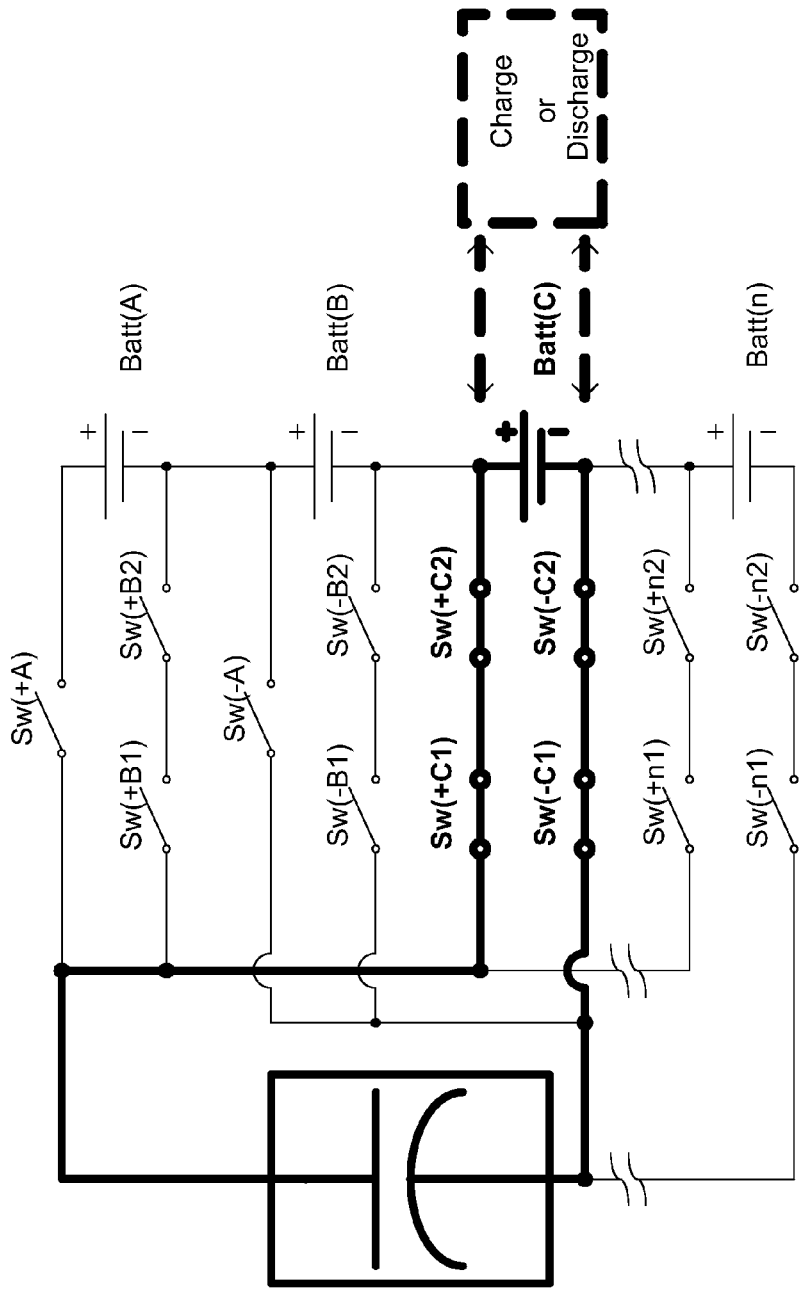
Figure 4D:
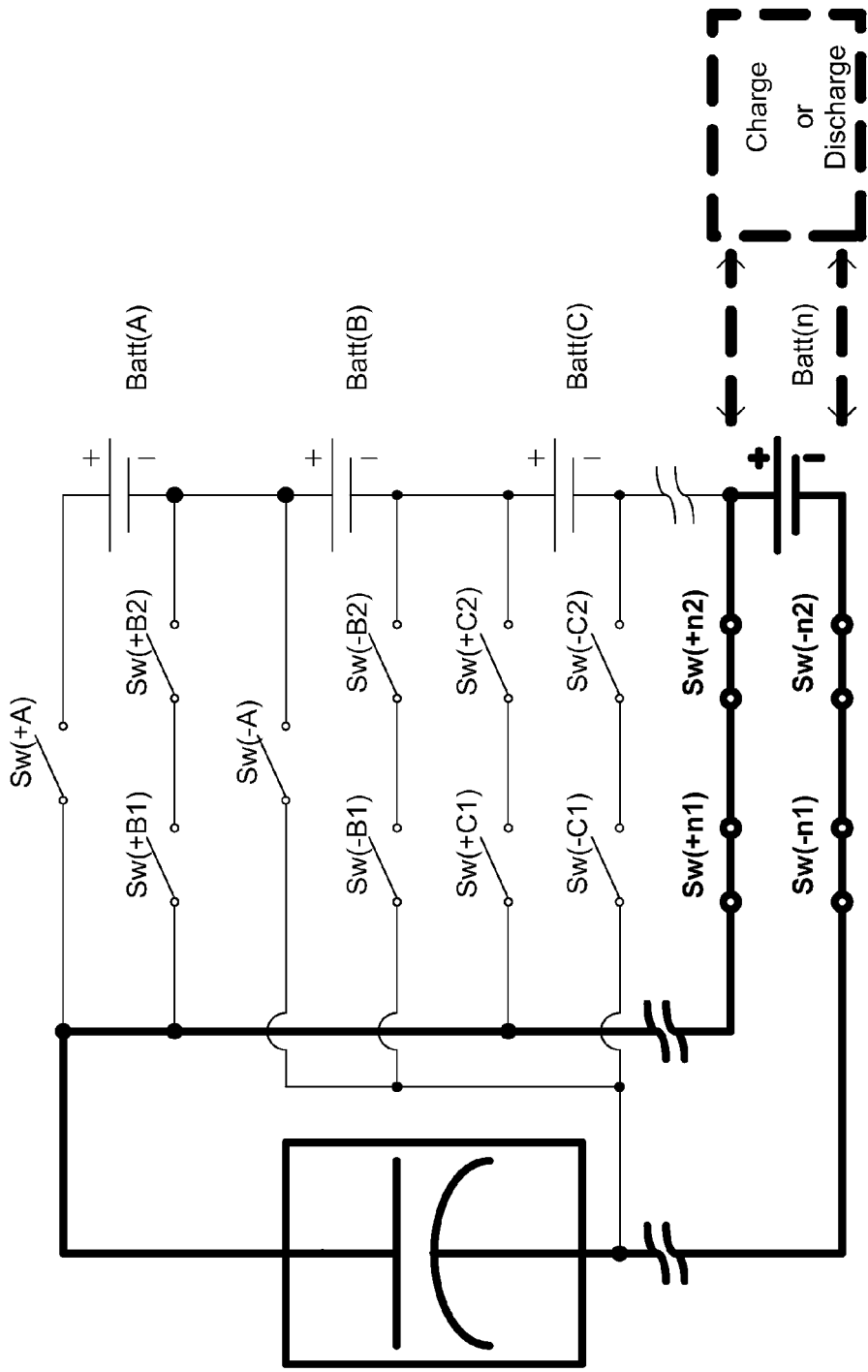
Figure 5:
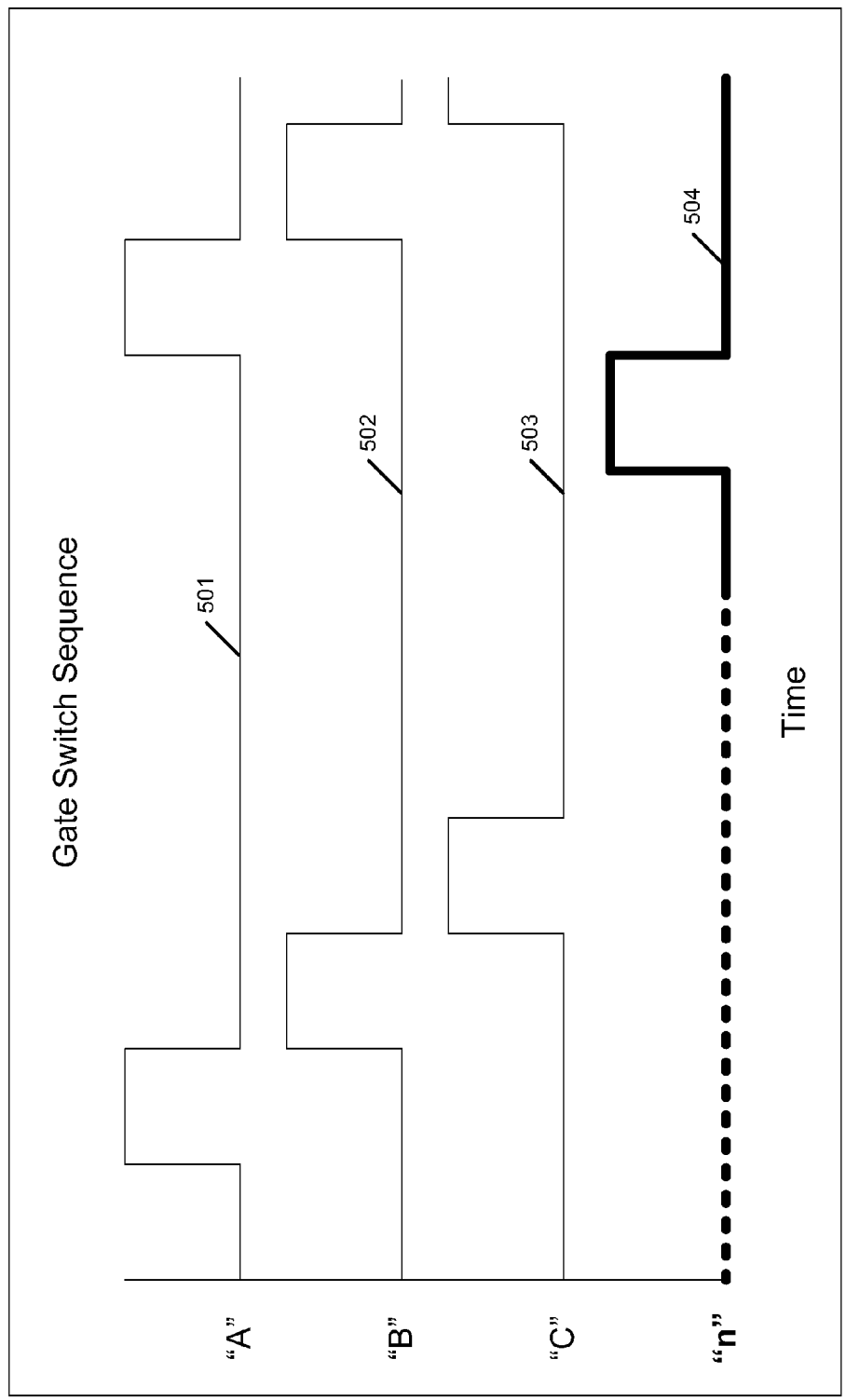
FIG. 5 is a timeline diagram illustrating timing of gate signals of switching elements of the batteries coupled in series according to one embodiment.

FIGS. 4A-4D are block diagrams illustrating a process of sequentially coupling each of batteries coupled in series according to one embodiment of the invention. FIG. 5 is a timeline diagram illustrating timing of gate signals of switching elements of the batteries coupled in series according to one embodiment. Referring to FIGS. 4A-4D and FIG. 5, in response to a gate signal 501, the corresponding switch element couples battery A to the capacitor while the rest of the batteries are decoupled as shown in FIG. 4A. In response to a gate signal 502, the corresponding switch element couples battery B to the capacitor while the rest of the batteries are decoupled as shown in FIG. 4B. In response to a gate signal 503, the corresponding switch element couples battery C to the capacitor while the rest of the batteries are decoupled as shown in FIG. 4C. Subsequently, in response to a gate signal 504, the corresponding switch element couples battery N to the capacitor while the rest of the batteries are decoupled as shown in FIG. 4D. As shown in FIG. 5, each of the signals 501-504 includes a pulse to turn on the corresponding switch element. However, no pulses are overlapped in time and thus, only one battery is coupled to the capacitor at a given time and each of the batteries is sequentially turned on and off.

Figure 6A:
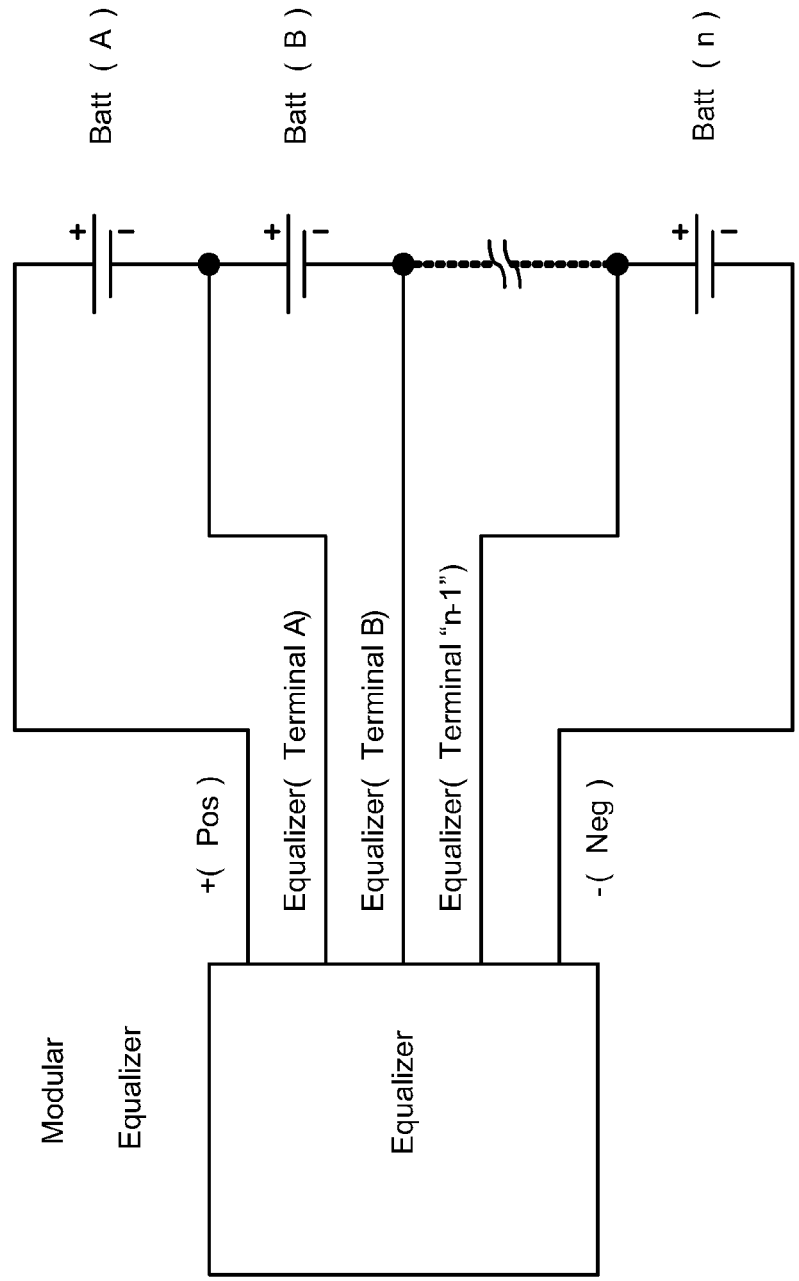
FIGS. 6A-6D are block diagrams illustrating various configurations used with a battery equalizer according to certain embodiments of the invention.
Figure 6B:
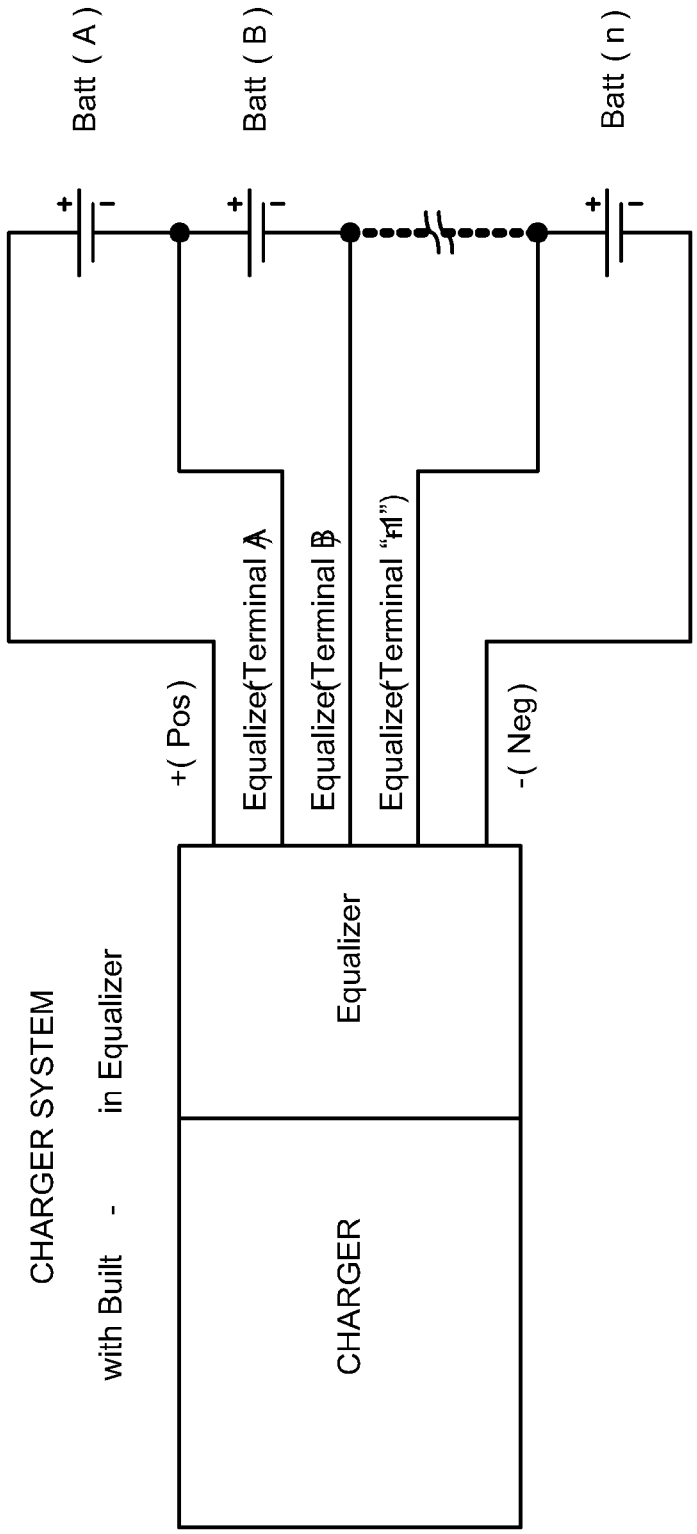
Figure 6C:
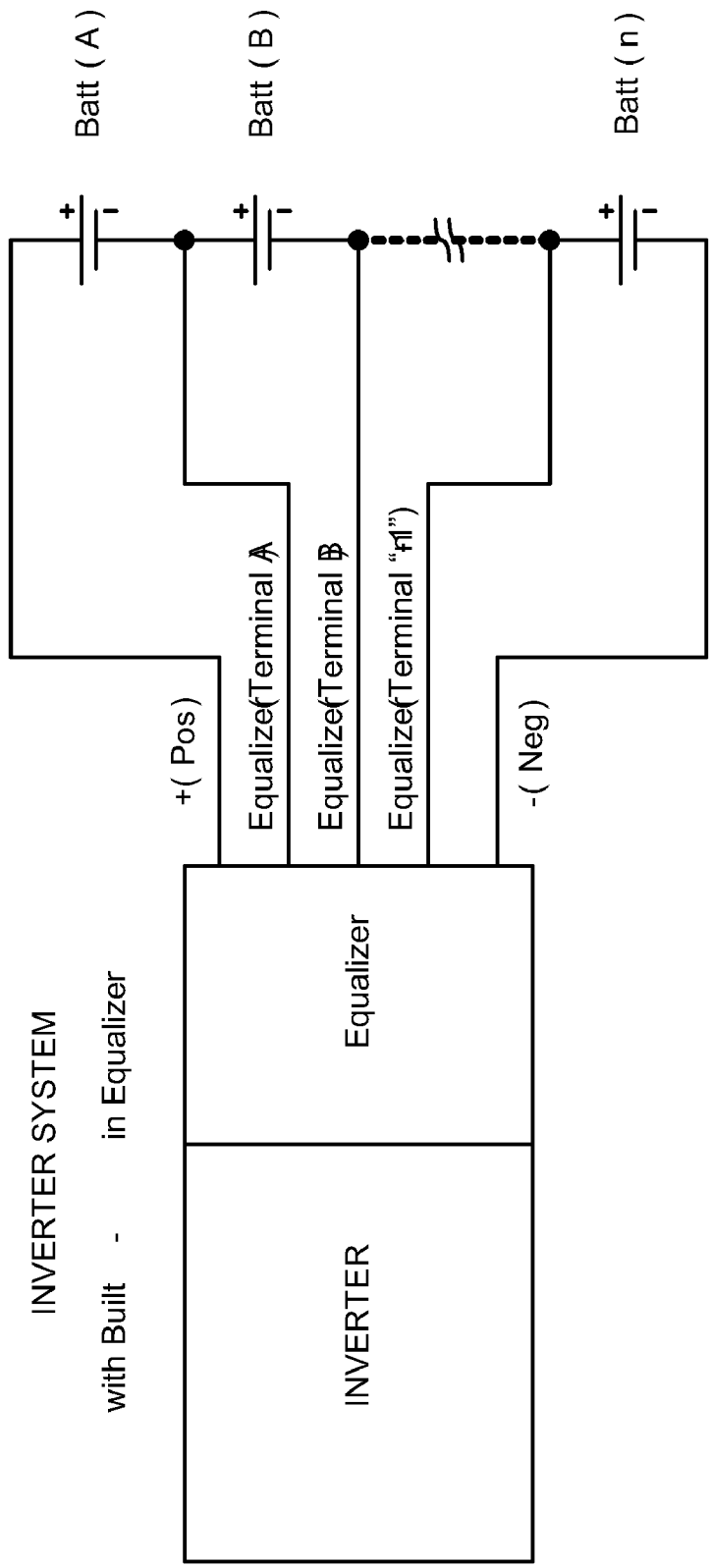
Figure 6D:
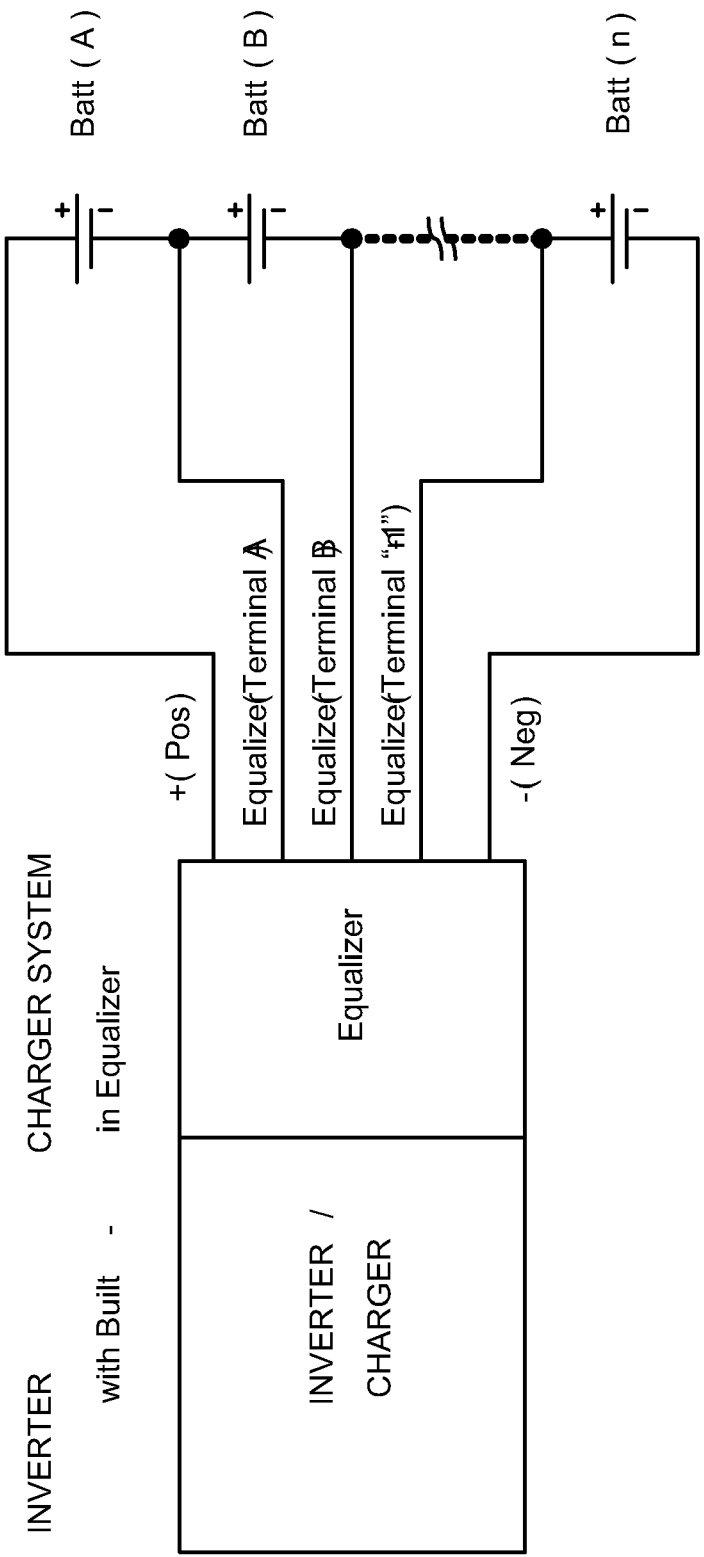
Figure 7A:
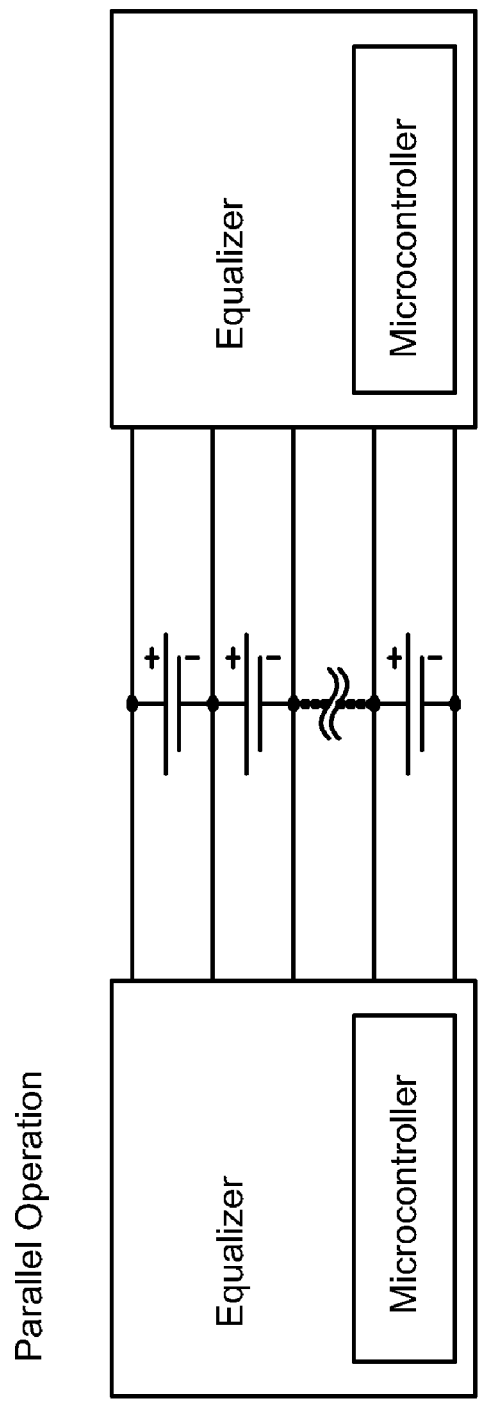
FIGS. 7A-7C are block diagrams illustrating various configurations used with a battery equalizer according to certain embodiments of the invention.
Figure 7C:
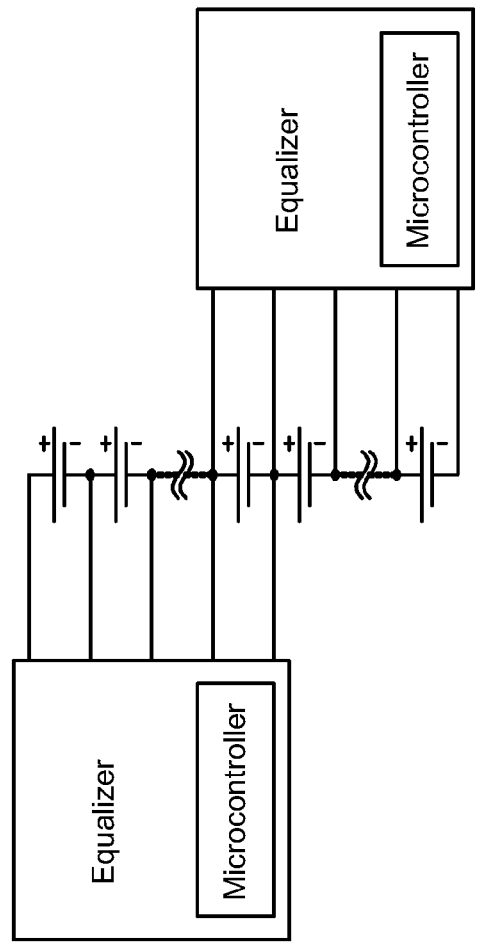
Figure 7B:
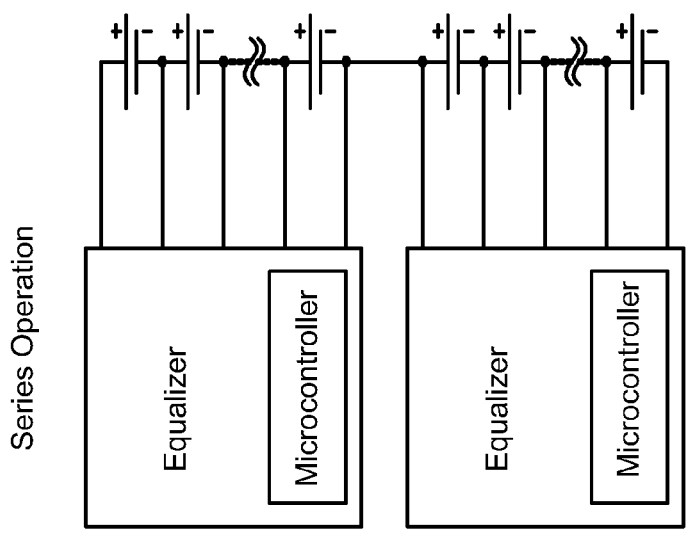

According to certain embodiments of the invention, an equalizer may be utilized in various configurations as shown in FIGS. 6A-6D. For example, an equalizer may be utilized as a standalone module as shown in FIG. 6A. Alternatively, an equalizer may be integrated with a charger as shown in FIG. 6B, with an inverter (e.g., load) as shown in FIG. 6C, or a combination of a charger and an inverter as shown in FIG. 6D. Further, according to certain embodiments of the invention, multiple equalizers may be used concurrently as shown in FIGS. 7A-7C. For example, multiple equalizers may operate in parallel as shown in FIG. 7A, in series as shown in FIG. 7B, or a combination of parallel and series operations as shown in FIG. 7C.

Figure 8:
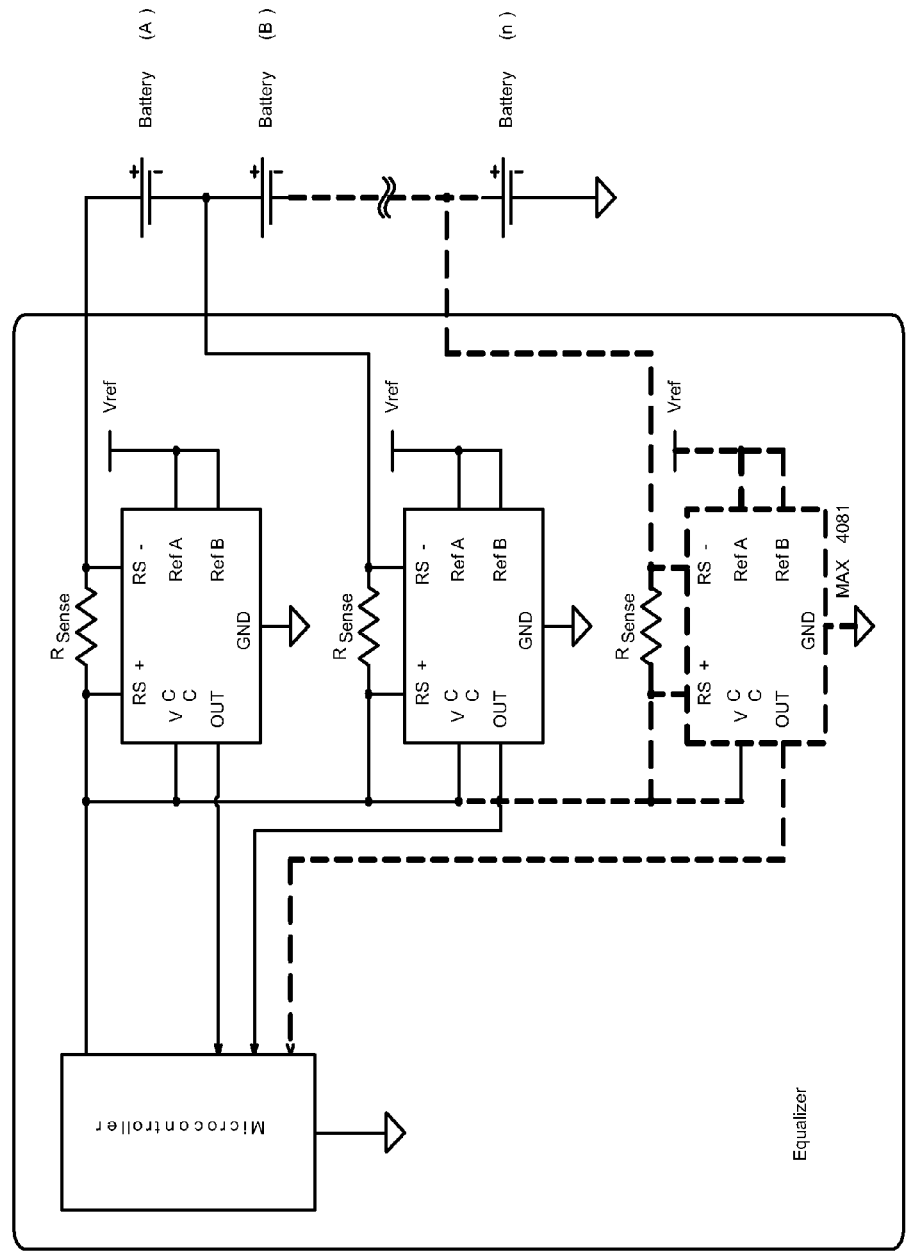
FIG. 8 is a schematic diagram illustrating an example of a battery equalizer according to another embodiment of the invention.

According to a further embodiment, for each battery coupled in series, an equalizer includes a current sense circuit to sense amount of current flowing between the capacitor and the corresponding battery being coupled. FIG. 8 is a schematic diagram illustrating an example of an equalizer having a current sense circuit according to one embodiment. Referring to FIG. 8, for each switch coupled to a battery (e.g., in this example, two switches coupled to both terminals of a battery), a current sense circuit includes an amplifier having an input coupled to a current sense resister. The current sense resister when there is a current flowing therein produces a voltage that represents the amount of current flowing therein. The amplifier in turn amplifies and produces an output which is fed back to the controller for controlling the duty cycles of the signals shown in FIG. 5. For example, the current sense amplifier may be a high-side, current-sense amplifier with voltage output circuit, such as, for example, MAX-4081 compatible circuit available from Maxim. Note that other components of an equalizer such as those shown in previous figures are omitted herein for the purposes of illustration. It will be appreciated that the circuits as shown in FIG. 8 can be applied to any of the equalizers shown in the previous figures. Other configurations may also exist.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A battery equalizer, comprising:
    a single capacitor;
    at least two switching circuits coupled to the single capacitor, each of the at least two switching circuits to be coupled to each of at least two batteries coupled in series;
    at least two driver circuits, each corresponding to one of the at least two switching circuits; and
    a controller coupled to the at least two driver circuits, wherein the controller is programmed to control the at least two driver circuits in order to drive the at least two switching circuits to sequentially couple the single capacitor to one of the at least two batteries coupled in series during charging and/or discharging of the at least two batteries, and wherein only one of the at least two switching circuits is turned on at a given time such that only one of the at least two batteries is coupled to the single capacitor at the given time.

2. The battery equalizer of claim 1, wherein each switching circuit comprises a first switch element and a second switch element, and wherein when the switching circuit couples the single capacitor to a battery, the first switch element couples a positive terminal of the single capacitor to a positive terminal of the battery and the second switch element couples a negative terminal of the single capacitor to a negative terminal of the battery.

3. The battery equalizer of claim 2, wherein each of the first and second switch elements comprises a field-effective transistor (FET), wherein a gate terminal of the FET receives a signal originated from the controller to cause a current flowing between a drain terminal and a source terminal of the FET which in turn couples a terminal of the single capacitor to a terminal of the battery.

4. The battery equalizer of claim 3, wherein the first switch element is a first n-channel FET (NFET) having a source terminal coupled to the positive terminal of the single capacitor and a drain terminal to be coupled to a positive terminal of the battery, and wherein the second switch element is a second NFET having a drain terminal to be coupled to the negative terminal of the battery and a source terminal coupled to the negative terminal of the single capacitor.

5. The battery equalizer of claim 4, further comprising a transformer having a primary winding, a first secondary winding, and a second secondary winding, wherein the primary winding is coupled to a driver circuit associated with the first and second switch elements, wherein the first secondary winding is coupled to a gate terminal and a source terminal of the first NFET, and wherein the second secondary winding is coupled to a gate terminal and a source terminal of the second NFET.

6. The battery equalizer of claim 2, wherein each of the first and second switch elements comprises an n-channel field-effective transistor (NFET) and a p-channel FET (PFET) coupled in series, and wherein a source terminal of the NFET is coupled to a drain terminal of the PFET.

7. The battery equalizer of claim 6, wherein the first switch element comprises a first NFET and a first PFET coupled with each other, and wherein a drain terminal of the first NFET is coupled to the positive terminal of the single capacitor and a source terminal of the first PFET is to be coupled to the positive terminal of the battery.

8. The battery equalizer of claim 7, wherein the second switch element comprises a second NFET and a second PFET coupled with each other, and wherein a drain terminal of the second NFET is coupled to the negative terminal of the single capacitor and a source terminal of the second PFET is to be coupled to the negative terminal of the battery.

9. The battery equalizer of claim 6, further comprising a transformer having a primary winding, a first secondary winding, a second secondary winding, a third secondary winding, and a fourth secondary winding, wherein the primary winding is coupled to a driver circuit associated with the first and second switch elements, wherein the first secondary winding is coupled to a gate terminal and a source terminal of the NFET of the first switch element and the second secondary winding is coupled to a gate terminal and a source terminal of the PFET of the first switch element, and wherein the third secondary winding is coupled to a gate terminal and a source terminal of the NFET of the second switch element and the fourth secondary winding is coupled to a gate terminal and a source terminal of the PFET of the second switch element.

10. The battery equalizer of claim 1, further comprising a current sense circuit associated with each of the driver circuits, wherein the current sense circuit is configured to monitor a charge/discharge current of the associated battery, and wherein an output of the current sense circuit is fed back to the controller.

11. The battery equalizer of claim 10, wherein the controller is configured to sequentially generate a pulse for each driver to control timing of the corresponding switching circuit, wherein the corresponding switch circuit is turned on within a duration of the associated pulse, and wherein the output of the current sense circuit is used by the controller to adjust the duration of the pulse.

12. The battery equalizer of claim 1, wherein the battery equalizer is embedded within one of an inverter, a charger, and a combination of an inverter and charger coupled to the at least two batteries.

13. The battery equalizer of claim 1, further comprising a current sense circuit coupled between the controller and each of the at least two switching circuits, wherein the current sense circuit is configured to sense a current flowing through the associated switching circuit and to limit amount of current further flowing through the corresponding switching circuit.

14. A battery charging system, comprising:
    a charger having an output to be coupled to at least two batteries coupled in series; and
    a first equalizer coupled to the charger to equalize an output of the at least two batteries, the first equalizer including
        a single capacitor,
        at least two switching circuits coupled to the single capacitor, each of the at least two switching circuits to be coupled to each of at least two batteries coupled in series,
        at least two driver circuits, each corresponding to one of the at least two switching circuits, and
        a controller coupled to the at least two driver circuits, wherein the controller is programmed to control the at least two driver circuits in order to drive the at least two switching circuits to sequentially couple the single capacitor to one of the at least two batteries coupled in series during charging and/or discharging of the at least two batteries, and wherein only one of the at least two switching circuits is turned on at a given time such that only one of the at least two batteries is coupled to the single capacitor at the given time.

15. The system of claim 14, wherein each switching circuit comprises a first switch element and a second switch element, and wherein when the switching circuit couples the single capacitor to a battery, the first switch element couples a positive terminal of the single capacitor to a positive terminal of the battery and the second switch element couples a negative terminal of the single capacitor to a negative terminal of the battery.

16. The system of claim 14, wherein the first equalizer further comprises a current sense circuit coupled between the controller and each of the at least two switching circuits, wherein the current sense circuit is configured to sense a current flowing through the associated switching circuit and to limit amount of current further flowing through the corresponding switching circuit.

17. The system of claim 14, further comprising a second equalizer coupled to the first equalizer in one of a series configuration and a parallel configuration.

18. A battery discharging system, comprising:
an inverter having an input to be coupled to at least two batteries coupled in series; and
a first equalizer coupled to the charger to equalize an output of the at least two batteries, the first equalizer including a single capacitor,
  at least two switching circuits coupled to the single capacitor, each of the at least two switching circuits to be coupled to each of at least two batteries coupled in series,
  at least two driver circuits, each corresponding to one of the at least two switching circuits, and
  a controller coupled to the at least two driver circuits, wherein the controller is programmed to control the at least two driver circuits in order to drive the at least two switching circuits to sequentially couple the single capacitor to one of the at least two batteries coupled in series during charging and/or discharging of the at least two batteries, and wherein only one of the at least two switching circuits is turned on at a given time such that only one of the at least two batteries is coupled to the single capacitor at the given time.

19. The system of claim 18, wherein each switching circuit comprises a first switch element and a second switch element, and wherein when the switching circuit couples the single capacitor to a battery, the first switch element couples a positive terminal of the single capacitor to a positive terminal of the battery and the second switch element couples a negative terminal of the single capacitor to a negative terminal of the battery.

20. The system of claim 18, wherein the first equalizer further comprises a current sense circuit coupled between the controller and each of the at least two switching circuits, wherein the current sense circuit is configured to sense a current flowing through the associated switching circuit and to limit amount of current further flowing through the corresponding switching circuit.

21. The system of claim 18, further comprising a second equalizer coupled to the first equalizer in one of a series configuration and a parallel configuration.

* * * * *